US012106398B2

(12) United States Patent
Oh et al.

(10) Patent No.: US 12,106,398 B2
(45) Date of Patent: Oct. 1, 2024

(54) MACHINE LEARNING-BASED CHROMA KEYING PROCESS

(71) Applicant: Adobe Inc., San Jose, CA (US)

(72) Inventors: Seoung Wug Oh, San Jose, CA (US); Joon-Young Lee, San Jose, CA (US); Brian Price, Pleasant Grove, UT (US); John G. Nelson, Normandy Park, WA (US); Wujun Wang, Mercer Island, WA (US); Adam Pikielny, Hanover, NH (US)

(73) Assignee: Adobe Inc., San Jose, CA (US)

( * ) Notice: Subject to any disclaimer, the term of this patent is extended or adjusted under 35 U.S.C. 154(b) by 111 days.

(21) Appl. No.: 17/726,304

(22) Filed: Apr. 21, 2022

(65) Prior Publication Data

US 2023/0342991 A1     Oct. 26, 2023

(51) Int. Cl.
*G06T 11/00*     (2006.01)
*G06N 3/084*    (2023.01)
(Continued)

(52) U.S. Cl.
CPC ............ *G06T 11/001* (2013.01); *G06N 3/084* (2013.01); *G06T 5/70* (2024.01); *G06T 5/73* (2024.01);
(Continued)

(58) Field of Classification Search
CPC ............ G06N 3/02; G06N 3/08; G06N 3/063; G06N 3/084; G06T 11/001; G06T 5/002;
(Continued)

(56) References Cited

U.S. PATENT DOCUMENTS

2008/0252788 A1* 10/2008 Dadourian ............. H04N 5/275
348/E9.055
2021/0074044 A1*  3/2021 Jung ........................ G06T 7/90
(Continued)

FOREIGN PATENT DOCUMENTS

EP          0543563 A2 * 11/1992 ............... H04N 9/75
EP          3737083 A1 * 11/2020 ............. G06N 20/00
GB          2560219 A  *  9/2018 ............. H04N 5/272

OTHER PUBLICATIONS

Foundry, "Keylight," retrieved from Internet: https://learn.foundry.com/nuke/content/reference_guide/keyer_nodes/keylight.html, accessed Apr. 21, 2022, 7 pages.
(Continued)

*Primary Examiner* — Maurice L. McDowell, Jr.
*Assistant Examiner* — Donna J. Ricks
(74) *Attorney, Agent, or Firm* — Nicholson De Vos Webster & Elliott LLP

(57) ABSTRACT

Embodiments are disclosed for a machine learning-based chroma keying process. The method may include receiving an input including an image depicting a chroma key scene and a color value corresponding to a background color of the image. The method may further include generating a preprocessed image by concatenating the image and the color value. The method may further include providing the preprocessed image to a trained neural network. The method may further include generating, using the trained neural network, an alpha matte representation of the image based on the preprocessed image.

20 Claims, 12 Drawing Sheets
(5 of 12 Drawing Sheet(s) Filed in Color)

(51) Int. Cl.
  *G06T 5/70* (2024.01)
  *G06T 5/73* (2024.01)
  *G06T 7/194* (2017.01)
(52) U.S. Cl.
  CPC .... *G06T 7/194* (2017.01); *G06T 2207/20081* (2013.01); *G06T 2207/20084* (2013.01)
(58) Field of Classification Search
  CPC .................. G06T 5/003; G06T 7/194; G06T 2207/20081; G06T 2207/20084
  See application file for complete search history.

(56) References Cited

U.S. PATENT DOCUMENTS

2021/0166400 A1* 6/2021 Goel .................. G06V 10/7747
2023/0071559 A1* 3/2023 Wang ........................ G06T 7/80

OTHER PUBLICATIONS

Levin et al., "A Closed-Form Solution to Natural Image Matting," IEEE Transactions on Pattern Analysis and Machine Intelligence, vol. 30, No. 2, Feb. 2008, 228-242.
Sengupta et al., "Background Matting: The World is Your Green Screen," 2020 IEEE/CVF Conference on Computer Vision and Pattern Recognition (CVPR), Jun. 2020, pp. 2288-2297.
Xu et al., "Deep Image Matting," 2017 IEEE Conference on Computer Vision and Pattern Recognition (CVPR), Jul. 2017, pp. 311-320.

* cited by examiner

MACHINE LEARNING-BASED CHROMA KEYING PROCESS

BACKGROUND

Chroma keying is an important part of post-production workflows in contemporary film industry. One of the main applications of chroma keying is compositing, where a foreground object is overlain onto a background. For example, an actor performs in front of a green screen (or typically another solid color) background and, using the knowledge of the background screen color, systems extract a matte of the performing actor as a top layer, while the background screen can be replaced with a different image upon which the extracted matte can be placed. Thus, an important part of the chroma keying process is obtaining an alpha matte representation of the image or video sequence. Existing solutions can be difficult to use to obtain a usable alpha matte without advanced experience and can be time-consuming/resource intensive.

SUMMARY

Introduced here are techniques/technologies that use machine learning to perform a chroma keying process on input images and/or video sequences. For example, in some embodiments, a digital design system receives an input, including an image depicting a chroma key scene and a color value associated with a background screen of the image. The digital design system generates a preprocessed image by concatenating the image with the color value. A trained light-weight neural network receives the preprocessed image and generates an alpha matte representation of the image. The generated alpha matte can be used without additional post-processing.

Additionally, the light-weight neural network is trained using training data, including customized training data augmented with noise (e.g., shadows, wrinkles, motion blur, etc.), resulting in a more robust model capable of handling both images and video. The neural network is further trained using two loss functions: a pixel loss and a gradient loss. Each loss function is based on a comparison of the predicted alpha matte and the ground truth alpha matte.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying drawings in which.

DETAILED DESCRIPTION

Figure 1:
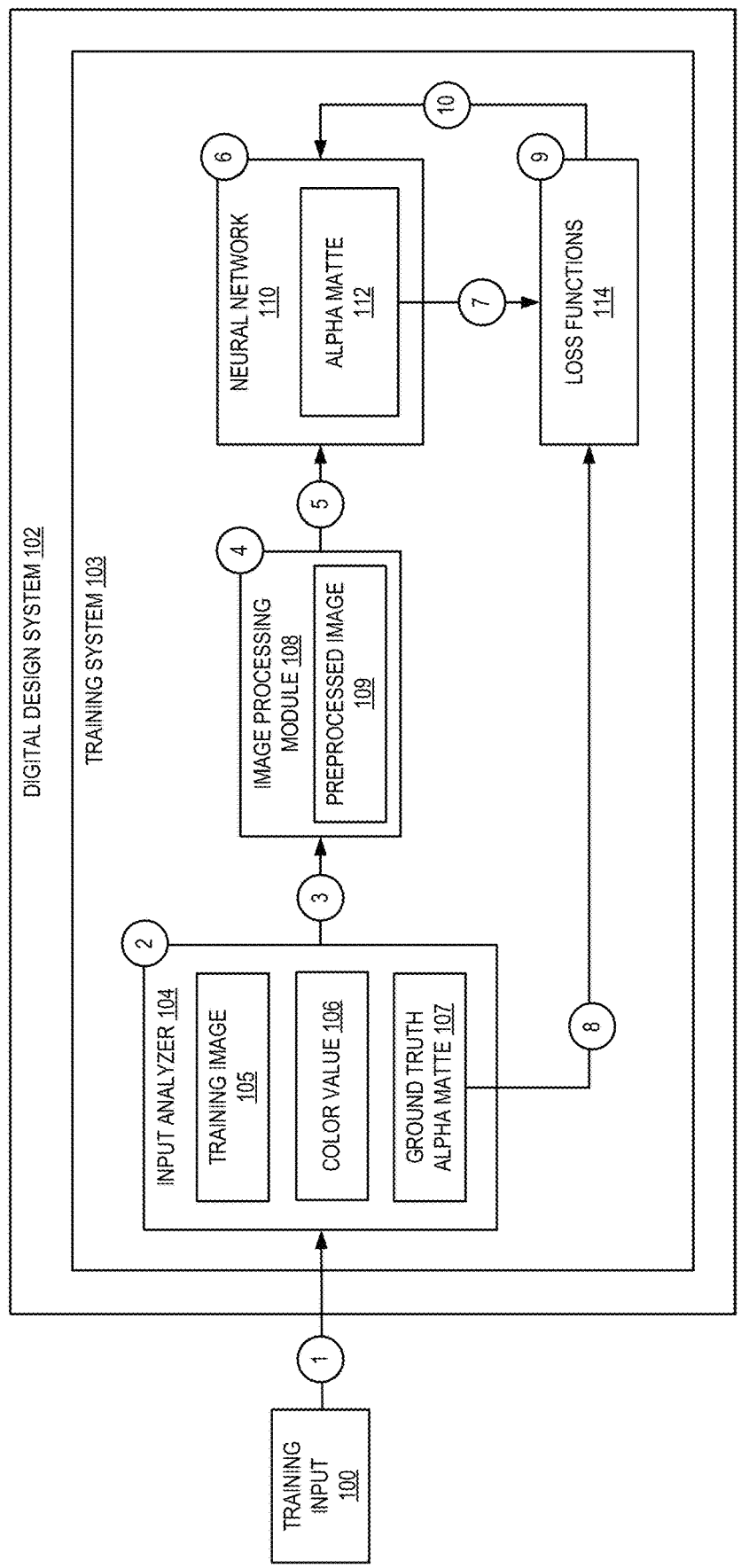
FIG. 1 illustrates a diagram of a training system for training a machine learning model to generate an alpha matte for an input using loss functions in accordance with one or more embodiments.

One or more embodiments of the present disclosure include a digital design system that uses machine learning to perform a chroma keying process. While existing systems can perform a chroma keying process, many have limitations, as they can be difficult to use or are unable to achieve a desired effect. For example, some chroma keying solutions require a large number of parameters to be set/tuned prior to processing in order to produce a useable output, including selecting a color bias, a screen gain, a screen balance, masks to better define the foreground and background, etc. Further, these solutions can be sensitive to noise (e.g., wrinkles and/or shadows on the background screen), resulting in outputs that require the user to perform manual post-processing adjustments. The need to both set pre-processing settings and perform post-processing tuning can be time-consuming and can result in an unsatisfactory user experience. For example, they can limit the usability of such existing solutions only to advanced users, leaving novice users unable to generate useable alpha mattes, giving the impression of a poor or inaccurate system, and creating a frustrating experience for the user.

Some machine learning solutions are directed to computing alpha mattes from natural images (e.g., without a chroma screen). For example, deep image matting focuses on tri-map based matting where pixel-level annotations for known foreground/background pixels and unknown pixels are provided, while background matting assumes the background scene is accurately known. However, both of these machine learning solutions are based on deep networks, which can be slow and thus time-consuming. For example, deep image matting solutions can require 25 layers, while background matting solutions can require more than 50 layers.

To address these and other issues, the digital design system trains and deploys a neural network to generate alpha mattes from input images and/or video sequences. In particular, in one or more embodiments, the digital design system receives an image or video sequence as an input and uses the neural network to predict an alpha matte representation of a foreground subject or object from the input that can be provided as an output to allow a user to insert the predicted alpha matte onto a different background.

Embodiments address these and other deficiencies of prior techniques through a number of optimizations. For example, the digital design system trains a light-weight neural network to generate a predicted alpha matte for an input image or video sequence. In one or more embodiments, the neural network is a seven-layer convolutional network. In other embodiments, the neural network can be less than seven layers. The neural network is trained using training images and video sequences (e.g., greenscreen videos, modified human portrait images, etc.), including customized training images and video sequences generated by the digital design system. The customized training images can be generated by taking non-chroma background portrait images, extracting the foreground subject, and overlaying the foreground subject over an artificial/synthetic chroma background (e.g., solid color background with a gradient). To further train the model to handle various noise, the customized training data can be augmented with synthetic noise. For example, the digital design system can add synthetic shadows, wrinkles, and different lighting conditions in the synthetic background and/or motion blur to the foreground subject. By generating the training data with synthetic backgrounds and synthetic noise, the customized training data more closely resembles real world data the model will perform inference on, resulting in a more robust chroma keying model.

Through training the digital design system as described above, the digital design system can generate an alpha matte representation of an input image. An input image and a color value corresponding to the color of the background of the input image are provided to the digital design system. A preprocessed image is generated by first spatially repeating the color value to match a resolution of the input image, and then concatenating the input image and the spatially repeated color value. The preprocessed image is then provided to a trained neural network, which generates an alpha matte representation of the input image, which can then be used to create new images or video sequences with different backgrounds.

Embodiments of the machine learning-based chroma keying process described herein provide an increase in usability and speed over existing systems. For example, because the digital design system can generate an alpha matte after being provided with an image and a color value, the digital design system can operate with minimal user interaction. This is unlike other systems that have to be manually configured through various parameter tunings prior to processing media, which requires both skill and additional time costs. In addition, because of the training process using the customized and, optionally, augmented training data, the digital design system is less sensitive to noise (e.g., wrinkles and/or shadows on the background screen) and produces a sharper matte that reduces/eliminates the need for a user to perform manual post-process adjustments.

FIG. 1 illustrates a diagram of a training system for training a machine learning model to generate an alpha matte for an input using loss functions in accordance with one or more embodiments. In one or more embodiments, a training system 103 is configured to train a neural network (e.g., neural network 110) to generate an alpha matte based on training inputs (e.g., images and/or videos), and their corresponding ground truth alpha mattes. In some embodiments, the training system 103 is a part of a digital design system 102. In other embodiments, the training system 103 can be a standalone system, or part of another system, and deployed to the digital design system 102. As shown in FIG. 1, the training system 103 receives a training input 100, as shown at numeral 1. For example, the digital design system 102 receives the training input 100 from a user via a computing device or from a memory or storage location. Although depicted as part of digital design system 102, in various embodiments, training system 103 may be implemented as a separate system implemented on electronic devices separate from the electronic devices implementing digital design system 102. In one or more embodiments, the training input 100 includes a training image 105 and a corresponding ground truth alpha matte 107. The training input 100 can include multiple pairs of training images and corresponding ground truth alpha mattes that can be fed to the training system 103 in parallel or in series.

Figure 2:
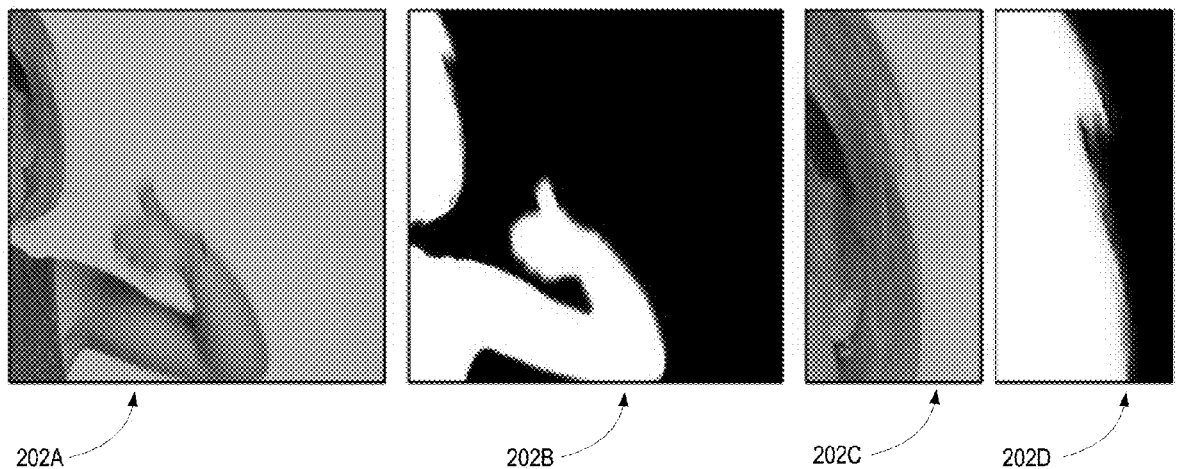
FIG. 2 illustrates examples of training input used to train the machine learning model in accordance with one or more embodiments.
Figure 2:
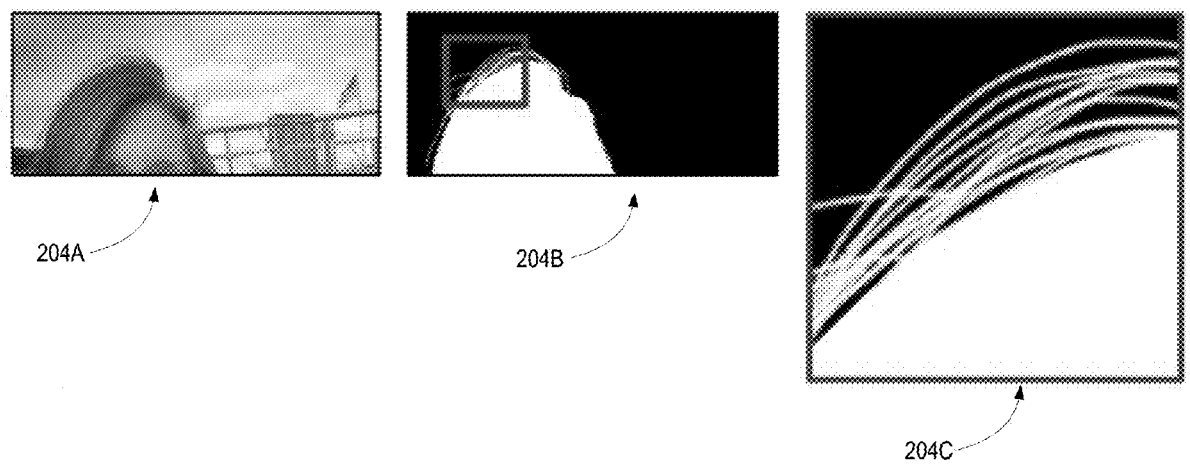

FIG. 2 illustrates examples of training input used to train the machine learning model in accordance with one or more embodiments. In one or more embodiments, the training input 100 can include two data sources: greenscreen videos and human portrait images. Although cropped greenscreen frames and portrait images are shown in FIG. 2, and in subsequent figures, embodiments can operate on full, uncropped greenscreen frames and portrait images. In one example, the machine learning model is trained using a greenscreen video dataset that includes videos with the corresponding ground truth alpha mattes, and a human portrait image dataset that includes high quality and medium quality human portrait images with corresponding ground truth alpha mattes. Training image 202A is an image frame from a greenscreen video with a corresponding ground truth alpha image 202B. Images 202C and 202D illustrate a magnified view of a portion of training image 202A and a portion of ground truth alpha image 202B, respectively. Training image 204A is a high quality portrait image with a corresponding ground truth alpha image 202B. Image 204D illustrates a magnified view of ground truth alpha image 202B at the portion indicated with the rectangular box 204C.

Returning to FIG. 1, in one or more embodiments, the digital design system 102 includes an input analyzer 104 that receives the training input 100. In some embodiments, the input analyzer 104 analyzes the training input 100, at numeral 2. In some embodiments, the input analyzer 104 analyzes the training input 100 to identify the training image 105, a color value 106 corresponding to a color of a background of the training image 105, and a ground truth alpha matte 107 corresponding to the training image 105. In some embodiments, the color value 106 corresponding to the color of a background of the training image 105 is not provided with the training image 105. In such embodiments, the color value 106 is selected randomly by the input analyzer 104 based on its analysis of the training image 105.

In one or more embodiments, after the input analyzer 104 analyzes the training input 100, the training image 105 and the color value 106 are sent to an image processing module 108, as shown at numeral 3. In one or more other embodiments, the input analyzer 104 optionally stores the training image 105 and the color value 106 in a memory or storage location for later access by the image processing module 108.

In one or more embodiments, the image processing module 108 generates a preprocessed image 109, as shown at numeral 4. In some embodiments, the image processing module 108 generates the preprocessed image 109 by concatenating the color value 106 with the training image 105 after spatially repeating the color value 106 to match the resolution of training image 105. For example, where training image 105 has a resolution of 256×256 pixels, the image processing module 108 generates an image with the same resolution (256×256 pixels), where every pixel is the same color as the color value 106. In one embodiment, the preprocessed image 109 is a six-channel image. In one or more embodiments, after the image processing module 108 generates the preprocessed image 109, the preprocessed image 109 is sent to the neural network 110, as shown at numeral 5.

In one or more embodiments, the neural network 110 generates an alpha matte 112 using the training image 105, as shown at numeral 6. The neural network 110 is an encoder-decoder network that uses convolutional layers to break down and reconstruct inputs. In one or more embodiments, the neural network 110 is a light-weight Hourglass network that includes seven convolutional layers for learning representations of images. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements machine learning techniques, i.e., machine learning that utilizes a set of algorithms to attempt to model high-level abstractions in data.

Figure 3:
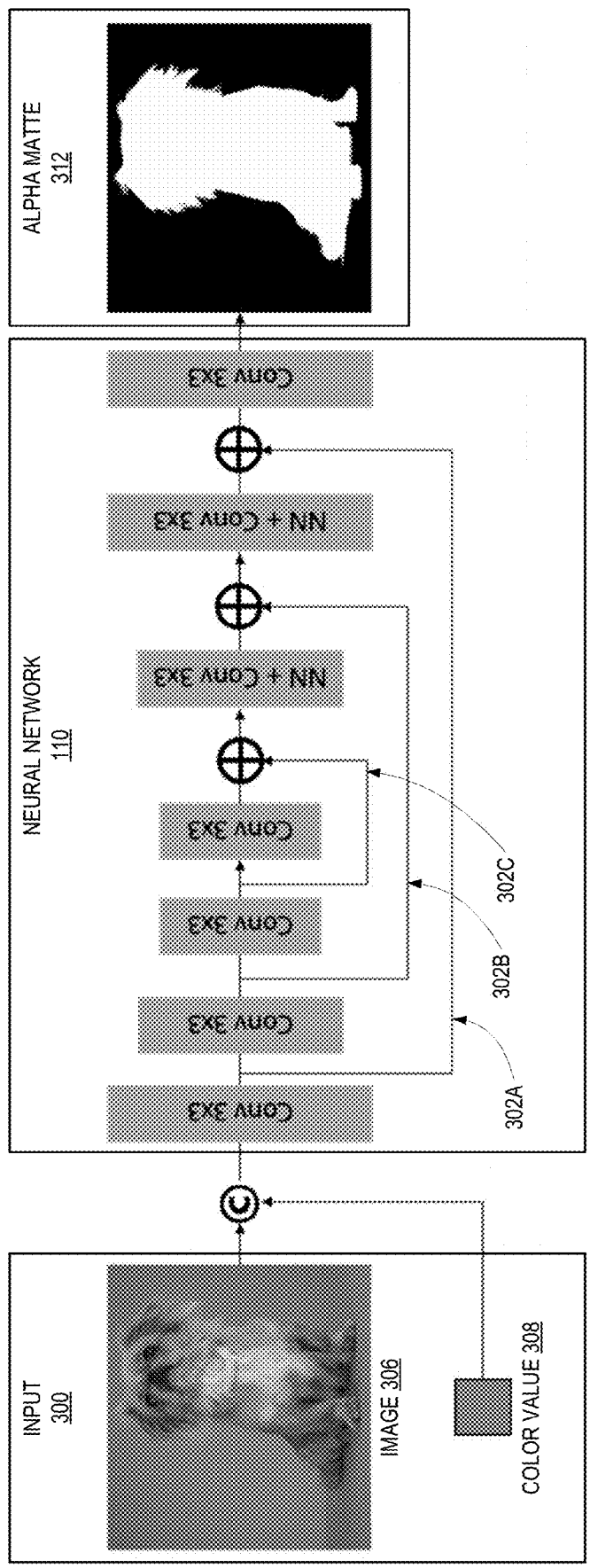
FIG. 3 illustrates additional details of a neural network trained to generate an alpha matte for an input image in accordance with one or more embodiments.

In one or more embodiments, the neural network 110 generates the alpha matte 112 by passing the training image 105 through a seven-layer convolutional neural network. FIG. 3 illustrates additional details of a neural network trained to generate an alpha matte for an input image in accordance with one or more embodiments. As illustrated in FIG. 3, an input 300 includes an image 306 and a color value 308 corresponding to a color of a background of the image 306. The image 306 and the color value 308 are concatenated to generate a preprocessed image, as described above, which is passed through the seven-layer convolutional neural network 110. Each of the layers can include 3×3 filters. In some embodiments, the first two layers of the neural network 110 reduce the size of the preprocessed image to one-quarter of the original size, followed by two additional layers that process the preprocessed image. The fifth and sixth layers of the neural network 110 then process the preprocessed image to return it to its original size using nearest neighbor interpolation. After the fourth layer, every feature map is reinforced with a skip connection that feeds the output of earlier layers to latter layers. As illustrated in FIG. 3, skip connection 302A feeds at least some of the output of the first layer to the output of the sixth layer via an element-wise matrix addition process, skip connection 302B feeds at least some of the output of the second layer to the output of the fifth layer via an element-wise matrix addition process, skip connection 302C feeds at least some of the output of the third layer to the output of the fourth layer via an element-wise matrix addition process. The seventh and final layer of the neural network 110 predicts a single-channel alpha matte 312 for the original input image 306. Each pixel of the alpha matte 312 represents the transparency of the foreground, where a value of 1 for a pixel indicates a solid foreground, a value of 0 for a pixel indicates a solid background, and a pixel with a value between 0 and 1 indicates a transparent area.

Returning to FIG. 1, the alpha matte 112 generated as a training output by the neural network 110 is sent to the loss functions 114, as shown in numeral 7. The loss functions 114 also receive or retrieve the ground truth alpha matte 107 from the training input 100, as shown at numeral 8.

The training system 103 then calculates the loss between the alpha matte 112 and the ground truth alpha matte 107 using loss functions 114, at numeral 9. In one or more embodiments, the loss functions 114 include a pixel loss and a gradient loss. The loss functions are used during training for optimization of the neural network 110.

The pixel loss can be determined by calculating the mean squared error (MSE) of the alpha matte 112 generated by the neural network 110, $\alpha_{PRED}$, and the ground truth alpha matte 107 from the training input 100, $\alpha_{GT}$, which can be expressed as follows:

$$\text{Pixel Loss} = \text{MSE}(\alpha_{PRED}, \alpha_{GT})$$

The gradient loss can be determined by calculating the MSE of the gradient of the alpha matte 112 generated by the neural network 110 and the gradient of the ground truth alpha matte 107 from the training input 100, $\alpha_{GT}$, which can be expressed as follows:

$$\text{Gradient Loss} = \text{MSE}(g_x(\alpha_{PRED}), g_x(\alpha_{GT})) + \text{MSE}(g_y(\alpha_{PRED}), g_y(\alpha_{GT})),$$

where $g_{(x,y)}$ is the gradient on the (x,y) axis.

Figure 4:
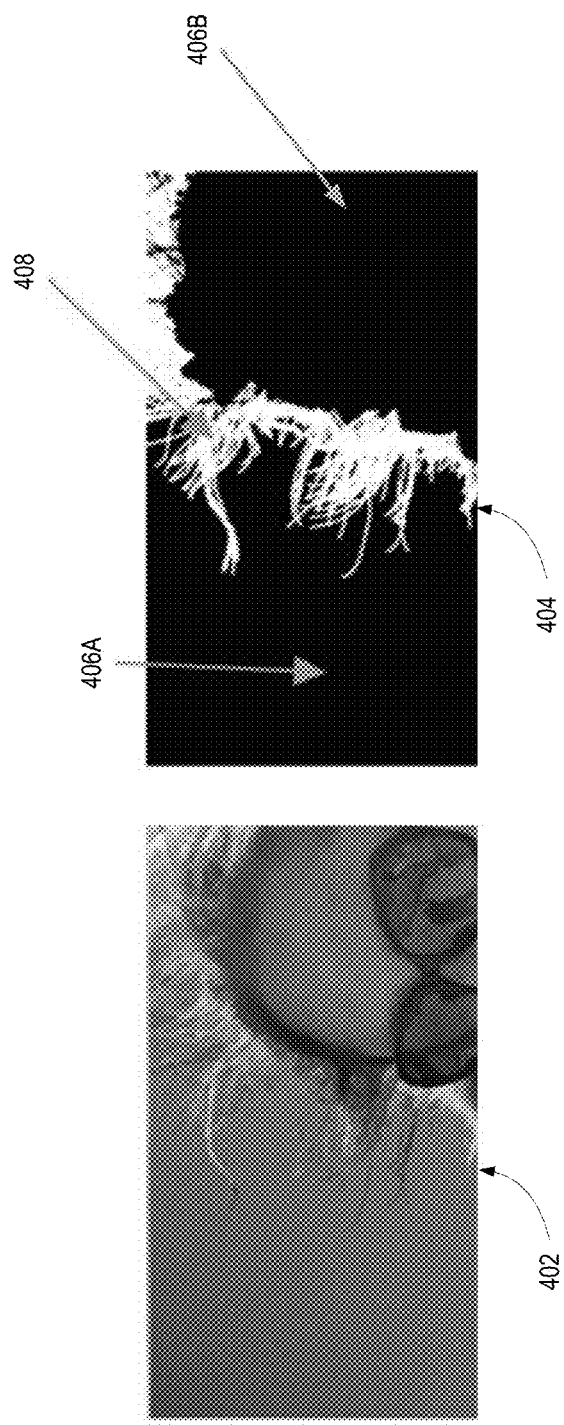
FIG. 4 illustrates an example of applying a spatially varying loss weighting in accordance with one or more embodiments.

In one or more embodiments, the loss functions 114 apply a spatially varying loss weighting where a higher weighting is applied to transparent pixels over solid foreground and background pixels. For example, transparent pixels can include the pixels located at the edges between foreground and background pixels, including pixels with transparent colors and pixels at the location of hair. In one or more embodiments, the loss functions 114 emphasize the loss computed for regions with transparent pixels five times more than the loss computed for regions with solid foreground and background pixels. FIG. 4 illustrates an example of applying a spatially varying loss weighting in accordance with one or more embodiments. FIG. 4 illustrates a training image 402 and a predicted alpha matte representation 404 of the training image 402. Region 406A represents a portion of the predicted alpha matte representation 404 that includes background pixels (e.g., pixels with an alpha value of 0). Region 406B represents a portion of the predicted alpha matte representation 404 that includes foreground object pixels (e.g., pixels with an alpha value of 1). Region 408 represents a portion of the predicted alpha matte representation 404 that includes transparent pixels (e.g., pixels with alpha values between 0 and 1). In one or more embodiments, the loss functions 114 would emphasize the loss for region 408 higher than the loss for regions 406A-B.

Returning to FIG. 1, the pixel loss and gradient loss are backpropagated to the neural network 110, as shown at numeral 10, and used to train the neural network.

Figure 5:
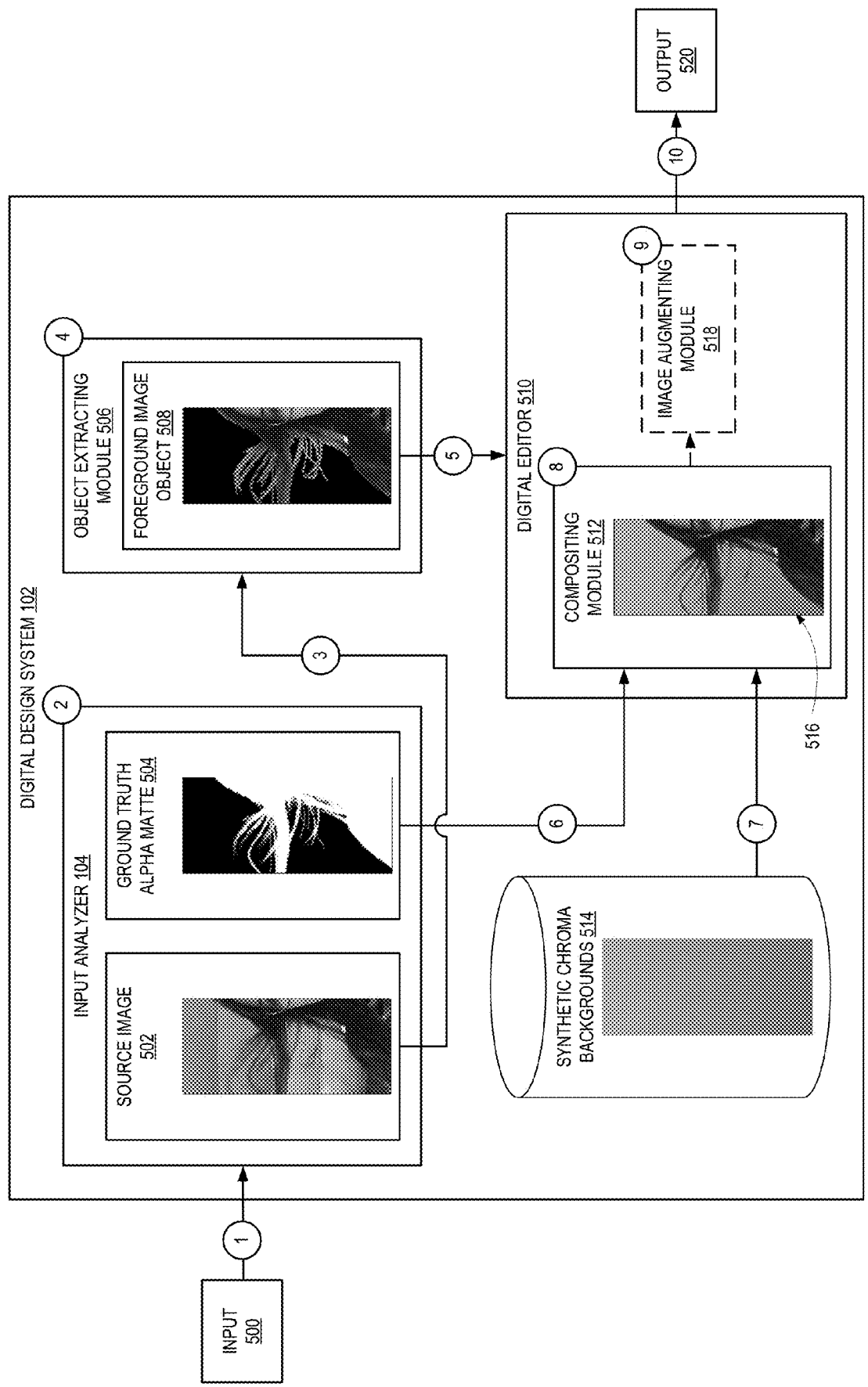
FIG. 5 illustrates a diagram of a process of generating customized training images from input media in accordance with one or more embodiments.

FIG. 5 illustrates a diagram of a process of generating customized training images from input media in accordance with one or more embodiments. As shown in FIG. 5, in one or more embodiments, a digital design system 102 receives an input 500, as shown at numeral 1. For example, the digital design system 102 receives the input 500 from a user via a computing device. The input 500 can include information specifying an image (e.g., a file name, a file location, etc.) to allow the digital design system 102 to access or retrieve the image from a memory or storage location. For example, the input can include training images and corresponding ground truth alpha mattes retrieved from a training data storage. In another example, a user may submit the input 500 to a web service, or an application configured to receive inputs and provide a processed output. In one or more embodiments, the digital design system 102 includes an input analyzer 104 that receives the input 500.

In one or more embodiments, the input analyzer 104 analyzes the input 500, at numeral 2. In some embodiments, the input analyzer 104 analyzes the input 500 to identify a source image 502 and a ground truth alpha matte 504 corresponding to the source image 502.

In one or more embodiments, after the input analyzer 104 analyzes the input 500, the source image 502 is sent to an object extracting module 506, as shown at numeral 3. In one or more other embodiments, the object extracting module 506 extracts a foreground image object 508 from the source image 502, as shown at numeral 4. The foreground image object 508 is extracted using an opaque foreground extraction algorithm. In some embodiments, the foreground extraction algorithm is a linear optimization algorithm based on local smoothness priors of the foreground and the background The foreground image object 508 is sent to a digital editor 510, as shown at numeral 5. The foreground image object 508 can be received by a compositing module 512 of the digital editor 510. In one or more embodiments, the compositing module 512 is configured to generate a customized training image from the original source image 502. As part of the process of generating the customized training image, the compositing module 512 receives or retrieves the ground truth alpha matte 504, as shown at numeral 6, and a synthetic chroma background from a synthetic chroma background storage 514, as shown at numeral 7. The selection of the synthetic chroma background from the synthetic chroma background storage 514 can be random, or a specific color can be selected as the synthetic chroma background. In some embodiments, the synthetic chroma background is generated based on a selection of a color for the background to be placed behind the extracted foreground object. Typically colors for the background include green and blue. Using the selected color, the synthetic chroma background is generated to have a same or similar resolution and/or dimension size as the extracted foreground object, or to fit the extract foreground object. In some embodiments, a gradient is then applied to the synthetic chroma background. In such embodiments, the application of the gradient to the synthetic chroma background encourages the neural network 110 to output a sharper alpha matte.

The compositing module 512 then generates a customized training image 516 using the foreground image object 508, the ground truth alpha matte 504, and the synthetic chroma background from the synthetic chroma background storage 514, at numeral 8. In one or more embodiments, the compositing module 512 performs an alpha blending of the foreground image object 508, the ground truth alpha matte 504, and the synthetic chroma background, using the following:

$$\text{Customized Training Image} = (A \times FG) + [(1-A) \times BG],$$

where A is the ground truth alpha matte 504, FG is the foreground image object 508, and BG is the synthetic chroma background.

Figure 6:
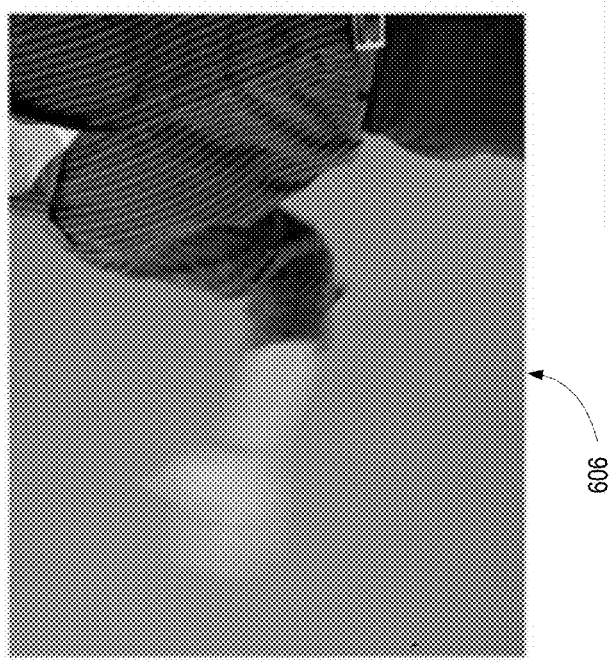
FIG. 6 illustrates examples of augmentations applied to customized training images in accordance with one or more embodiments.
Figure 6:
Figure 6:
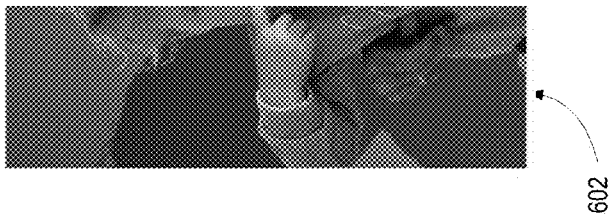

In one or more embodiments, the customized training image 516 can be sent to an image augmenting module 518 for optional augmentations to the customized training image 516, at numeral 9. The optional augmentations can include adding synthetic shadows, wrinkles, motion blur, and altered lighting conditions to the customized training image 516. In some embodiments, a synthetic shadow is generated by masking the foreground image object 508 and reshaping the mask into a random shape, translating the mask, and/or rotating the mask. In some embodiments, a wrinkle is generated by creating random shapes and/or symbols (e.g., ellipses, circles, etc.) on the background of the customized training image 516. By augmenting the customized training image 516 with synthetic noise, the system can be trained to be more robust to handle both images and videos provided at inference. FIG. 6 illustrates examples of augmentations applied to customized training images in accordance with one or more embodiments. For example, customized training image 602 and customized training image 604 can be portrait images and customized training images 606 can be a frame from a greenscreen video. As depicted in FIG. 6, customized training image 602 has been augmented to include a synthetic shadow, customized training image 604 has been augmented to include synthetic wrinkles, and customized training image 606 has been augmented to include motion blur.

Returning to FIG. 5, after the customized training image 516 is generated by the compositing module 512, and any optional augmentations are applied by the image augmenting module 518, the digital design system 102 can return the customized training image 516 as an output 520, as shown at numeral 10. In one or more embodiments, after the process described above in numerals 1-9, the output 520 is sent to the user or computing device that provided the input 500 to the digital design system 102. For example, after the process described above in numerals 1-10, the customized training image 516 can be displayed in the user interface.

Figure 7:
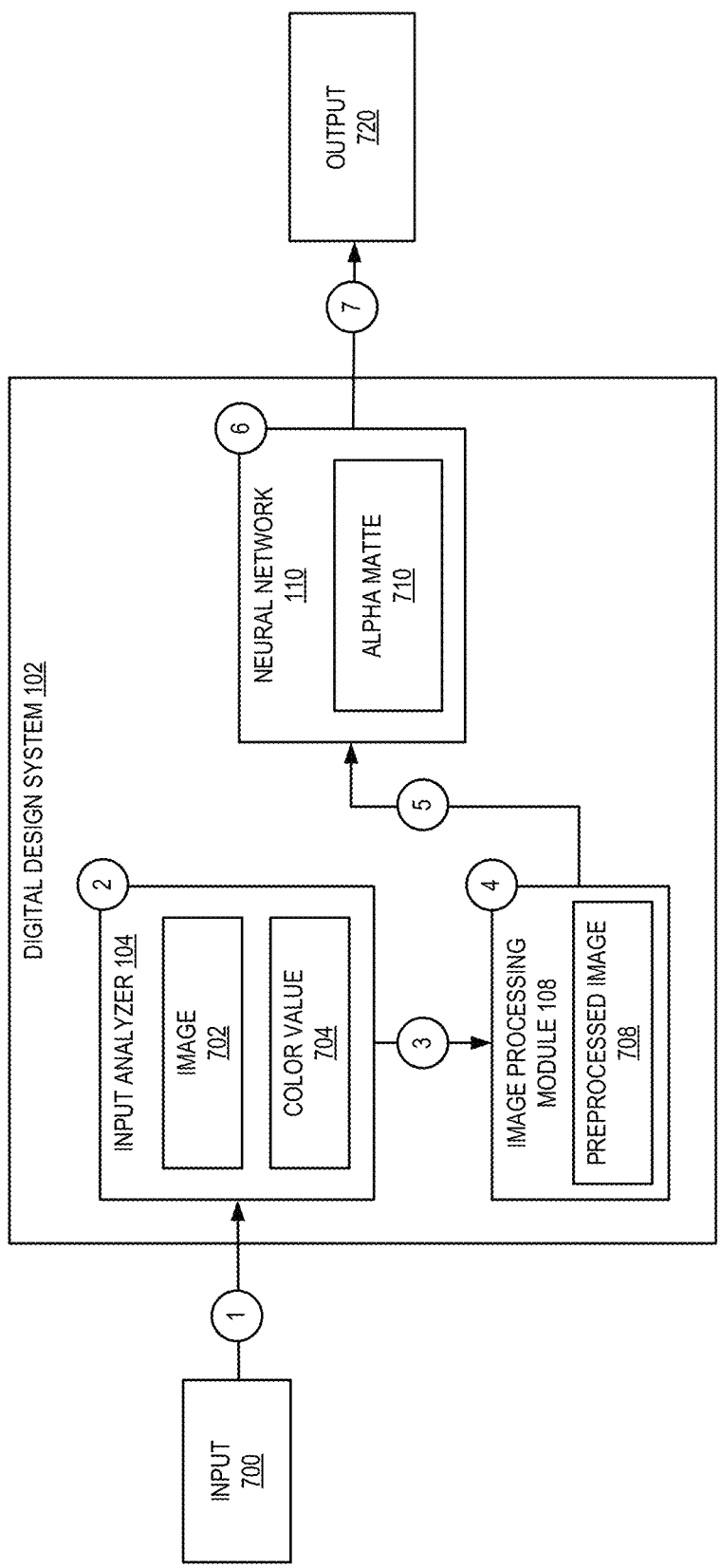
FIG. 7 illustrates a diagram of a process of generating alpha mattes from input media using a trained neural network in accordance with one or more embodiments.

FIG. 7 illustrates a diagram of a process of generating alpha mattes from input media using a trained neural network in accordance with one or more embodiments. As shown in FIG. 1, in one or more embodiments, a digital design system 102 receives an input 700, as shown at numeral 1. For example, the digital design system 102 receives the input 700 from a user via a computing device. The input 700 can include information specifying an image (e.g., a file name, a file location, etc.) to allow the digital design system 102 to access or retrieve the image 702 from a memory or storage location. In another example, a user may submit the input 700 to a web service, or an application configured to receive inputs and provide a processed output. Although FIG. 7 is described with respect to an image as the input media received in input 700, the input 700 can also be a video sequence, including a real-time video sequence. For example, for a video sequence, the digital design system 102 can process the real-time video sequence frame-by-frame in the same manner as the digital design system 102 processes an image (e.g., image 702). In one or more embodiments, the digital design system 102 includes an input analyzer 104 that receives the input 700.

In one or more embodiments, the input analyzer 104 analyzes the input 700, at numeral 2. In some embodiments, the input analyzer 104 analyzes the input 700 to identify the image 702 and a color value 704 corresponding to a color of a background of the image 702. In one or more embodiments, when the input 700 does not include a color value 704, the digital design system 102 can determine a color value 704 by analyzing the image 702.

In one or more embodiments, after the input analyzer 104 analyzes the input 700, the input 700 is sent to the neural network an image processing module 108, as shown at numeral 3. In one or more other embodiments, the input analyzer 104 optionally stores the input 700 in a memory or storage location for later access by the image processing module 108.

In one or more embodiments, the image processing module 108 generates a preprocessed image 708, as shown at numeral 4. In some embodiments, the image processing module 108 generates the preprocessed image 708 by concatenating the color value 704 with the image 702 after spatially repeating the color value 704 to match the resolution of the image 702. For example, where image 702 has a resolution of 256×256 pixels, the image processing module 108 generates an image with the same resolution (256×256 pixels), where every pixel is the same color as the color value 704, and then concatenates the image 702 with this generated image. In one embodiment, the preprocessed image is a six-channel image. In one or more embodiments, after the image processing module 108 generates the preprocessed image 708, the preprocessed image 708 is sent to the neural network 110, as shown at numeral 5.

In one or more embodiments, the neural network 110 generates an alpha matte 710 using the preprocessed image 708, as shown at numeral 6. In one or more embodiments, the neural network 110 generates the alpha matte 710 by passing the training image 702 through a seven-layer convolutional neural network, as described above with respect to FIGS. 1 and 2. In one or more embodiments, the neural network 110 includes a light-weight network architecture for learning representations of images. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements machine learning techniques, i.e., machine learning that utilizes a set of algorithms to attempt to model high-level abstractions in data After the neural network 110 generates the alpha matte 710 for the image 702, the digital design system 102 can return the alpha matte 710 as an output 720, as shown at numeral 7. In one or more embodiments, after the process described above in numerals 1-6, the output 720 is sent to the user or computing device that provided the input 700 to the digital design system 102. For example, after the process described above in numerals 1-6, the alpha matte 710 can be displayed in the user interface.

Figure 8:
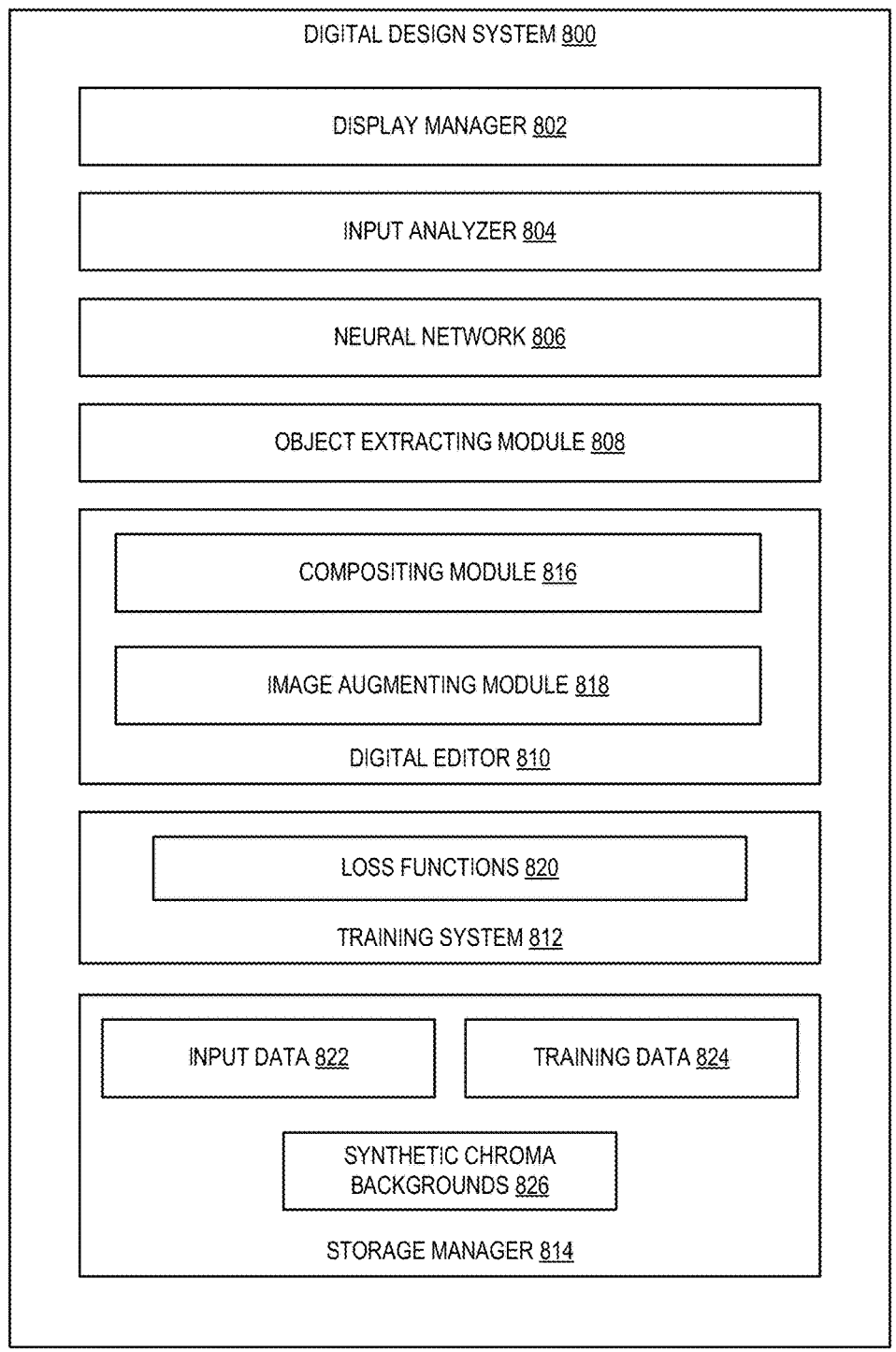
FIG. 8 illustrates a schematic diagram of a digital design system in accordance with one or more embodiments.

FIG. 8 illustrates a schematic diagram of a digital design system (e.g., "digital design system" described above) in accordance with one or more embodiments. As shown, the digital design system 800 may include, but is not limited to, a display manager 802, an input analyzer 804, a neural network 806, an object extracting module 808, a digital editor 810, a training system 812 (e.g., training system 103 described above), and a storage manager 814. The digital editor 810 includes compositing module 816 and image augmenting module 818. The training system 812 includes a loss functions 820. The storage manager 814 includes input data 822, training data 824, and synthetic chroma backgrounds 826.

As illustrated in FIG. 8, the digital design system 800 includes a display manager 802. In one or more embodiments, the display manager 802 identifies, provides, manages, and/or controls a user interface provided on a computing device. Examples of displays include interactive whiteboards, graphical user interfaces (or simply "user interfaces") that allow a user to view and interact with content items, or other items capable of display on a display screen.

For example, the display manager 802 may identify, display, update, or otherwise provide various user interfaces that include one or more display elements in various layouts. In one or more embodiments, the display manager 802 can identify a display provided on a touch screen. For example, a display provided on a touch screen may include a graphical user interface including one or more display elements capable of being interacted with via one or more touch gestures or other types of user inputs (e.g., using a stylus, a mouse, or other input devices). In one or more other embodiments, the display manager 802 can identify other types of displays (e.g., including monitors, projectors, headsets, etc.) that may be interacted with using a variety of input devices.

More specifically, the display manager 802 can identify a variety of display elements within a graphical user interface as well as the layout of the graphical user interface. For example, the display manager 802 may identify a graphical user interface including one or more display elements. Display elements include, but are not limited to buttons, text boxes, menus, thumbnails, scroll bars, hyperlinks, etc. In one or more embodiments, the display manager 802 can identify a graphical user interface layout as well as the display elements displayed therein.

As further illustrated in FIG. 8, the audio recommendation system 800 also includes an input analyzer 804. The input analyzer 804 analyzes an input received by the digital design system 800 to identify input images and/or video sequences, and color values representing the color a background of the input images and/or video sequences. In one or more embodiments, the input analyzer 804 extracts the input images and/or video sequences and the color value from the input.

As illustrated in FIG. 8, the digital design system 800 includes a neural network 806. In one or more embodiments, the neural network 806 is a light-weight network architecture for learning representations of images. The neural network 806 can receive or retrieve preprocessed images generated from input, including training images, from a computing device or from a storage location (e.g., storage manager 814). A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements machine learning techniques, i.e., machine learning that utilizes a set of algorithms to attempt to model high-level abstractions in data As further illustrated in FIG. 8, the digital design system 800 also includes an object extracting module 808. In one or more embodiments, the object extracting module 808 is configured to extract a foreground image object from a source image. For example, the object extracting module 808 can extract a person from a portrait image. In one or more embodiments, the object extracting module 808 extracts a foreground image object using an opaque foreground extraction algorithm.

As further illustrated in FIG. 8, the digital design system 800 also includes a digital editor 810. In one or more embodiments, the digital editor 810 includes a compositing module 816 configured to generate customized training images from original source images. To generate a customized training image, the compositing module 816 receives or retrieves a foreground image object extracted from a source image, a ground truth alpha matte corresponding to the source image and a synthetic chroma background (e.g., from a synthetic chroma background storage 826). The selection of the synthetic chroma background from the synthetic chroma background storage 526 can be random, or a specific color can be selected as the synthetic chroma background. In one or more embodiments, a gradient is applied to the synthetic chroma background. The compositing module 816 then generates a customized training image by performing an alpha blending of the foreground image object, the ground truth alpha matte, and the synthetic chroma background.

As further illustrated in FIG. 8, the digital editor 810 includes an image augmenting module 818 configured to apply optional augmentations to the customized training image generated by the compositing module 816. The optional augmentations can include adding synthetic shadows, wrinkles, and motion blur to the customized training image. In one or more embodiments, a synthetic shadow is generated by masking the foreground image object and reshaping the mask into a random shape. In one or more embodiments, a wrinkle is generated by creating random shapes and/or symbols (e.g., ellipses, circles, etc.) on the background of the customized training image.

As further illustrated in FIG. 8, the digital design system 800 includes training system 812 which is configured to teach, guide, tune, and/or train one or more neural networks. In particular, the training system 812 trains a neural network, such as neural network 806, based on a plurality of training data (e.g., training data 824). In one or more embodiments, the training data includes images and/or video sequences, corresponding ground truth alpha mattes. The training images and/or video sequences are provided to the neural network 806 which then learns to generate and output alpha mattes from the training input. More specifically, the training system 812 is configured to access, identify, generate, create, and/or determine training input and utilize the training input to train and fine-tune neural network 806. For instance, the training system 812 trains the neural network 806 using loss functions 820. Loss functions 820, as discussed above, compares predicated alpha mattes generated by the neural network 806 to a ground truth alpha matte, and trains the neural network 806 to minimize the loss.

In one or more embodiments, lost functions 820 include two loss functions: a pixel loss and a gradient loss. The pixel loss is defined as the mean squared error between the predicted alpha matte and the ground truth alpha matte. The gradient loss is defined as the mean squared error between the gradient of the predicted alpha matte and the ground truth alpha matte. In one or more embodiments, the digital design system 800 utilizes a spatially varying loss weighting that emphasizes the loss computed on regions with transparent pixels five times more than the loss computed on solid foreground and background pixels.

As illustrated in FIG. 8, the digital design system 800 also includes the storage manager 814. The storage manager 814 maintains data for the digital design system 800. The storage manager 814 can maintain data of any type, size, or kind as necessary to perform the functions of the digital design system 800. The storage manager 814, as shown in FIG. 8, includes input data 822, training data 824, and synthetic chroma backgrounds 826. The input data 822 can include data received by the digital design system 800 as inputs from a computing device. The input data 822 can include an image input, a training input, or any other suitable input to be processed by the neural network 806 to generate an alpha matte. The training data 824 can include training images and/or video sequences (e.g., greenscreen video sequences), with corresponding ground truth alpha mattes, for training the neural network 806. The training images and/or video sequences can include custom training images and/or video sequences generated by the digital design system 800. The synthetic chroma backgrounds 826 can include chroma backgrounds that can be applied to training images and/or video sequences as part of the process of generating the custom training images and/or video sequences. The synthetic chroma backgrounds 826 can include chroma backgrounds with gradients applied to the color of the chroma backgrounds.

Each of the components 802-814 of the digital design system 800 and their corresponding elements (as shown in FIG. 8) may be in communication with one another using any suitable communication technologies. It will be recognized that although components 802-814 and their corresponding elements are shown to be separate in FIG. 8, any of components 802-814 and their corresponding elements may be combined into fewer components, such as into a single facility or module, divided into more components, or configured into different components as may serve a particular embodiment.

The components 802-814 and their corresponding elements can comprise software, hardware, or both. For example, the components 802-814 and their corresponding elements can comprise one or more instructions stored on a computer-readable storage medium and executable by processors of one or more computing devices. When executed by the one or more processors, the computer-executable instructions of the digital design system 800 can cause a client device and/or a server device to perform the methods described herein. Alternatively, the components 802-814 and their corresponding elements can comprise hardware, such as a special purpose processing device to perform a certain function or group of functions. Additionally, the components 802-814 and their corresponding elements can comprise a combination of computer-executable instructions and hardware.

Furthermore, the components 802-814 of the digital design system 800 may, for example, be implemented as one or more stand-alone applications, as one or more modules of an application, as one or more plug-ins, as one or more library functions or functions that may be called by other applications, and/or as a cloud-computing model. Thus, the components 802-814 of the digital design system 800 may be implemented as a stand-alone application, such as a desktop or mobile application. Furthermore, the components 802-814 of the digital design system 800 may be implemented as one or more web-based applications hosted on a remote server. Alternatively, or additionally, the components of the digital design system 800 may be implemented in a suite of client device applications or "apps."

Figure 9:
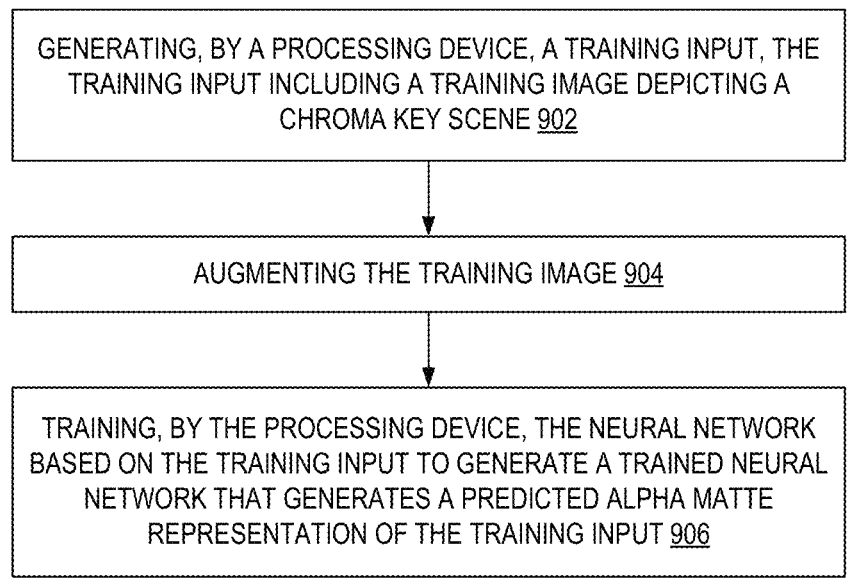
FIG. 9 illustrates a flowchart of a series of acts in a method of training a neural network to generated alpha matte representations of images in accordance with one or more embodiments.
Figure 10:
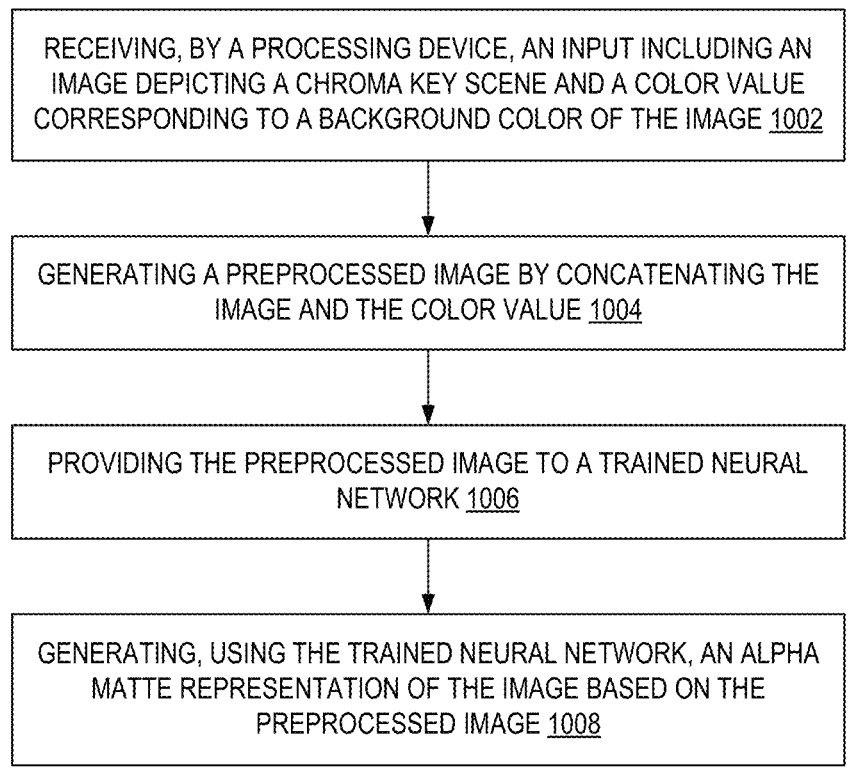
FIG. 10 illustrates a flowchart of a series of acts in a method of generating an output including an alpha matte representation of an input image in accordance with one or more embodiments.

FIGS. 1-8, the corresponding text, and the examples, provide a number of different systems and devices that allows a digital design system to predict an alpha matte for an input image or video sequence using a trained neural network. In addition to the foregoing, embodiments can also be described in terms of flowcharts comprising acts and steps in a method for accomplishing a particular result. For example, FIGS. 9 and 10 illustrate flowcharts of exemplary methods in accordance with one or more embodiments. The methods described in relation to FIGS. 9 and 10 may be performed with less or more steps/acts or the steps/acts may be performed in differing orders. Additionally, the steps/acts described herein may be repeated or performed in parallel with one another or in parallel with different instances of the same or similar steps/acts.

FIG. 9 illustrates a flowchart 900 of a series of acts in a method of training a neural network to generated alpha matte representations of images in accordance with one or more embodiments. In one or more embodiments, the method 900 is performed in a digital medium environment that includes the digital design system 800. The method 900 is intended to be illustrative of one or more methods in accordance with the present disclosure and is not intended to limit potential embodiments. Alternative embodiments can include additional, fewer, or different steps than those articulated in FIG. 9.

As shown in FIG. 9, the method 900 includes an act 902 of generating, by a processing device, a training input, the training input including a training image depicting a chroma key scene. In one or more embodiments, the training image can be a customized training image. For example, the training image can be a natural image from which a foreground object (e.g., a person) has been extracted. Once extracted, the customized training image is generated by blending the extracted foreground object with a synthetic chroma background.

As shown in FIG. 9, the method 900 includes an act 904 of augmenting the training image. In some embodiments, augmenting the training image includes adding noise (e.g., shadows, wrinkles, motion blur, altered lighting conditions, etc.) to train the neural network to be more robust in handling real world inputs. The augmentations can be added to the training image by applying modifications to the training image, such as adding shapes and objects to the background of the training image, altering the brightness and/or contrast of the training image, etc.

As shown in FIG. 9, the method 900 includes an act 906 of training, by the processing device, the neural network based on the training input to generate a trained neural network that generates a predicted alpha matte representation of the training input. In one or more embodiments, the processing device generates a preprocessed image from the training input that is received by the neural network. In such embodiments, the preprocessed image is generated by concatenating the training image and a color value corresponding to a color of a background of the training image. The preprocessed image can then be provided to the neural network.

In some embodiments, the neural network is an encoder-decoder network that uses convolutional layers to break down and reconstruct the training image provided as input. In one or more embodiments, the neural network 110 is a light-weight Hourglass network that includes seven convolutional layers.

The output of the neural network is a predicted alpha matte that can then be compared to the ground truth alpha matte received as input by the processing device. Training the neural network includes the utilization of two loss functions using the predicted alpha matte and the ground truth alpha matte, and whose outputs are backpropagated to the neural network. The pixel loss can be defined as the mean squared error between the predicted alpha matte and the ground truth alpha matte. The gradient loss can be defined as the mean squared error between the gradient of the predicted alpha matte and the ground truth alpha matte.

FIG. 10 illustrates a flowchart 1000 of a series of acts in a method of generating an output including an alpha matte representation of an input image in accordance with one or more embodiments. In one or more embodiments, the method 1000 is performed in a digital medium environment that includes the digital design system 800. The method 1000 is intended to be illustrative of one or more methods in accordance with the present disclosure and is not intended to limit potential embodiments. Alternative embodiments can include additional, fewer, or different steps than those articulated in FIG. 10.

As shown in FIG. 10, the method 1000 includes an act 1002 of receiving, by a processing device, an input including an image depicting a chrome key scene and a color value corresponding to a background color of the image. In one or more embodiments, the processing device receives the input from a user (e.g., via a computing device). In one or more embodiments, the user may select the input in an application, or the user may submit the input to a web service or an application configured to receive inputs.

As shown in FIG. 10, the method 1000 includes an act 1004 of generating a preprocessed image by concatenating the image and the color value. In one or more embodiments, an image processing module generates the preprocessed image by spatially repeating the color value to match the spatial resolution of the image.

As shown in FIG. 10, the method 1000 includes an act 1006 of providing the preprocessed image to a trained neural network. In one or more embodiments, the neural network is a light-weight Hourglass network trained to generate an alpha matte representation of an input image.

As shown in FIG. 10, the method 1000 includes an act 1008 of generating, using trained neural network, an alpha matte representation of the image based on the preprocessed image. In some embodiments, the neural network is an encoder-decoder network that uses convolutional layers to break down and reconstruct the preprocessed image generated by the processing device. In one or more embodiments, the neural network 110 is a light-weight Hourglass network that includes seven convolutional layers.

In one or more embodiments, once generated, the alpha matte representation of the image can be provided as an output. For example, the processing device can display the alpha matte representation of the image in a user interface. The alpha matte representation of the image can be presented on a user interface on the user computing device that submitted the request to generate the alpha matte representation of the image. In one or more other embodiments, the alpha matte representation of the image can be transmitted to the user computing device as a file or stored in a memory or storage location. Once the alpha matte representation of the image is generated, the alpha matte representation of the image can be utilized in a chroma keying process to place the foreground image of the alpha matte representation of the image onto a background.

Figure 11:
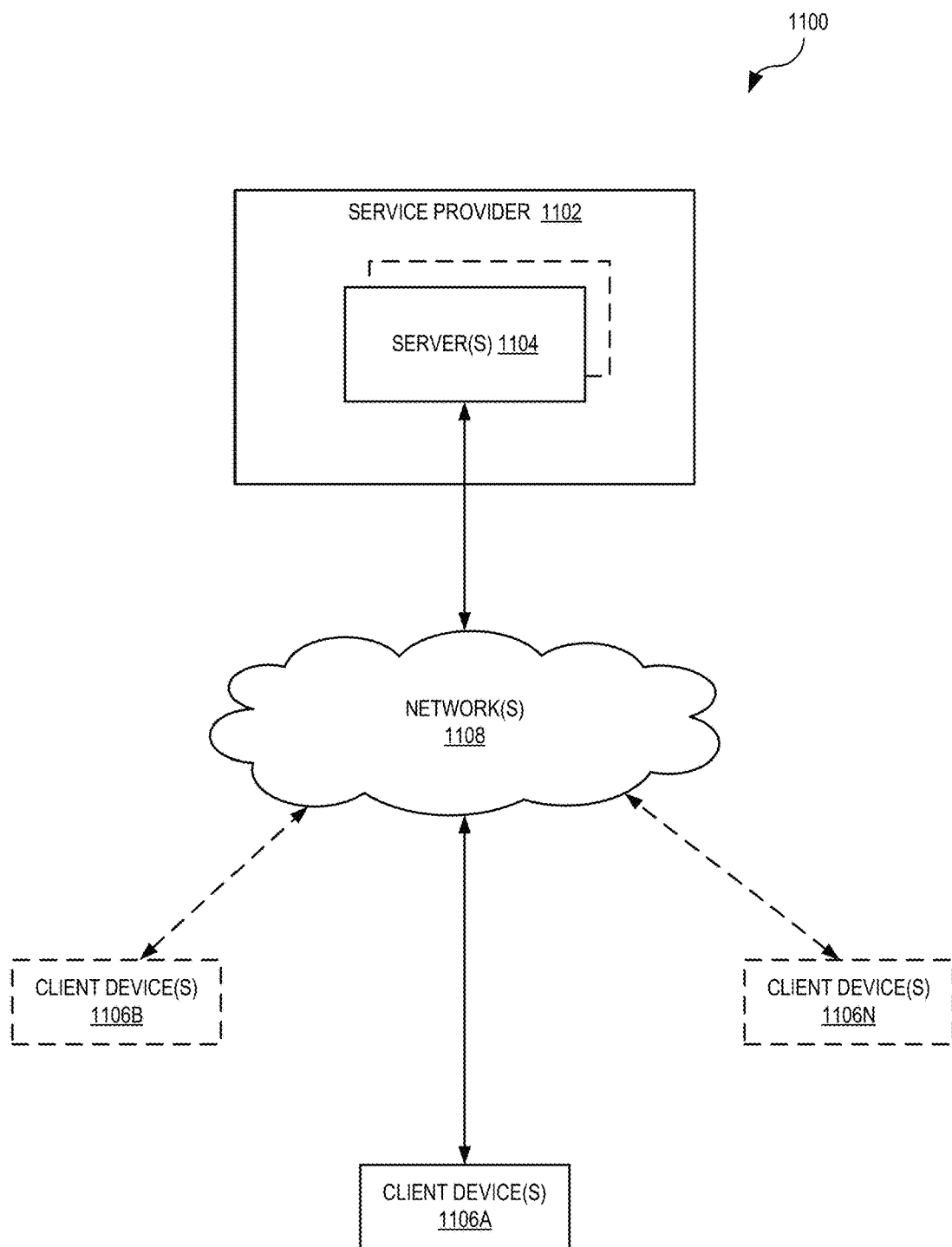
FIG. 11 illustrates a schematic diagram of an exemplary environment in which the digital design system can operate in accordance with one or more embodiments.

FIG. 11 illustrates a schematic diagram of an exemplary environment 1100 in which the digital design system 800 can operate in accordance with one or more embodiments. In one or more embodiments, the environment 1100 includes a service provider 1102 which may include one or more servers 1104 connected to a plurality of client devices 1106A-1106N via one or more networks 1108. The client devices 1106A-1106N, the one or more networks 1108, the service provider 1102, and the one or more servers 1104 may communicate with each other or other components using any communication platforms and technologies suitable for transporting data and/or communication signals, including any known communication technologies, devices, media, and protocols supportive of remote data communications, examples of which will be described in more detail below with respect to FIG. 12.

Although FIG. 11 illustrates a particular arrangement of the client devices 1106A-1106N, the one or more networks 1108, the service provider 1102, and the one or more servers 1104, various additional arrangements are possible. For example, the client devices 1106A-1106N may directly communicate with the one or more servers 1104, bypassing the network 1108. Or alternatively, the client devices 1106A-1106N may directly communicate with each other. The service provider 1102 may be a public cloud service provider which owns and operates their own infrastructure in one or more data centers and provides this infrastructure to customers and end users on demand to host applications on the one or more servers 1104. The servers may include one or more hardware servers (e.g., hosts), each with its own computing resources (e.g., processors, memory, disk space, networking bandwidth, etc.) which may be securely divided between multiple customers, each of which may host their own applications on the one or more servers 1104. In some embodiments, the service provider may be a private cloud provider which maintains cloud infrastructure for a single organization. The one or more servers 1104 may similarly include one or more hardware servers, each with its own computing resources, which are divided among applications hosted by the one or more servers for use by members of the organization or their customers.

Similarly, although the environment 1100 of FIG. 11 is depicted as having various components, the environment 1100 may have additional or alternative components. For example, the environment 1100 can be implemented on a single computing device with the digital design system 800. In particular, the digital design system 800 may be implemented in whole or in part on the client device 1102A.

As illustrated in FIG. 11, the environment 1100 may include client devices 1106A-1106N. The client devices 1106A-1106N may comprise any computing device. For example, client devices 1106A-1106N may comprise one or more personal computers, laptop computers, mobile devices, mobile phones, tablets, special purpose computers, TVs, or other computing devices, including computing devices described below with regard to FIG. 12. Although three client devices are shown in FIG. 11, it will be appreciated that client devices 1106A-1106N may comprise any number of client devices (greater or smaller than shown).

Moreover, as illustrated in FIG. 11, the client devices 1106A-1106N and the one or more servers 1104 may communicate via one or more networks 1108. The one or more networks 1108 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 1108 may be any suitable network over which the client devices 1106A-1106N may access service provider 1102 and server 1104, or vice versa. The one or more networks 1108 will be discussed in more detail below with regard to FIG. 12.

In addition, the environment 1100 may also include one or more servers 1104. The one or more servers 1104 may generate, store, receive, and transmit any type of data, including input data 822, training data 824, synthetic chroma backgrounds 826, or other information. For example, a server 1104 may receive data from a client device, such as the client device 1106A, and send the data to another client device, such as the client device 1102B and/or 1102N. The server 1104 can also transmit electronic messages between one or more users of the environment 1100. In one example embodiment, the server 1104 is a data server. The server 1104 can also comprise a communication server or a web-hosting server. Additional details regarding the server 1104 will be discussed below with respect to FIG. 12.

As mentioned, in one or more embodiments, the one or more servers 1104 can include or implement at least a portion of the digital design system 800. In particular, the digital design system 800 can comprise an application running on the one or more servers 1104 or a portion of the digital design system 800 can be downloaded from the one or more servers 1104. For example, the digital design system 800 can include a web hosting application that allows the client devices 1106A-1106N to interact with content hosted at the one or more servers 1104. To illustrate, in one or more embodiments of the environment 1100, one or more client devices 1106A-1106N can access a webpage supported by the one or more servers 1104. In particular, the client device 1106A can run a web application (e.g., a web browser) to allow a user to access, view, and/or interact with a webpage or website hosted at the one or more servers 1104.

Upon the client device 1106A accessing a webpage or other web application hosted at the one or more servers 1104, in one or more embodiments, the one or more servers 1104 can provide a user of the client device 1106A with an interface to provide an input (e.g., images or video sequences). In one or more embodiments, the one or more servers 1104 can further provide a user of the client device 1106A with an interface to provide a color value representing a color of a background of the input. Upon receiving the input text and the color selection, the one or more servers 1104 can automatically perform the methods and processes described above to generate an alpha matte corresponding to the input image or video sequence. The one or more servers 1104 can provide an output including the generated alpha matte to the client device 1106A for display to the user.

As just described, the digital design system 800 may be implemented in whole, or in part, by the individual elements 1102-1108 of the environment 1100. It will be appreciated that although certain components of the digital design system 800 are described in the previous examples with regard to particular elements of the environment 1100, various alternative implementations are possible. For instance, in one or more embodiments, the digital design system 800 is implemented on any of the client devices 1106A-N. Similarly, in one or more embodiments, the digital design system 800 may be implemented on the one or more servers 1104. Moreover, different components and functions of the digital design system 800 may be implemented separately among client devices 1106A-1106N, the one or more servers 1104, and the network 1108.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
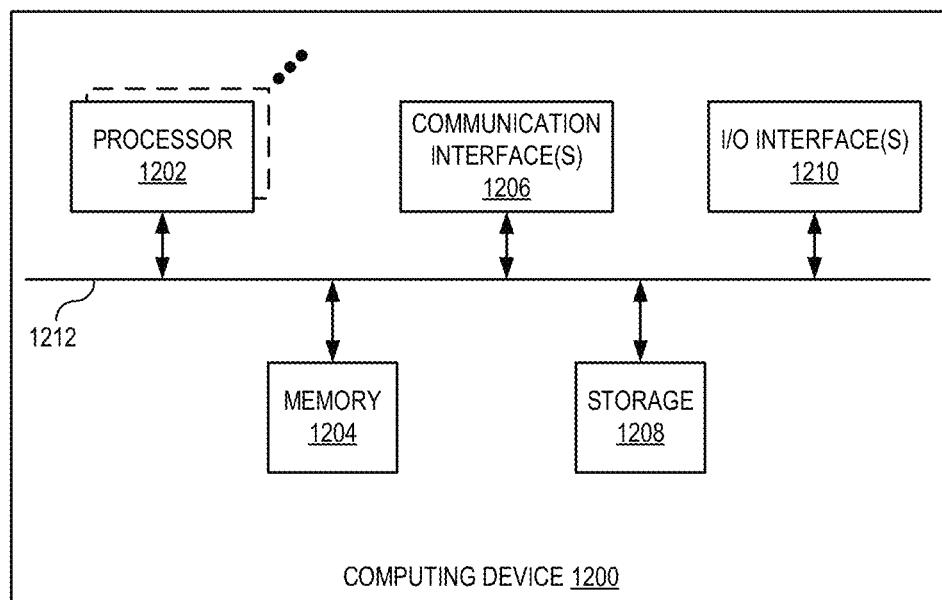
FIG. 12 illustrates a block diagram of an exemplary computing device in accordance with one or more embodiments.

FIG. 12 illustrates, in block diagram form, an exemplary computing device 1200 that may be configured to perform one or more of the processes described above. One will appreciate that one or more computing devices such as the computing device 1200 may implement the digital design system 800. As shown by FIG. 12, the computing device can comprise a processor 1202, memory 1204, one or more communication interfaces 1206, a storage device 1208, and one or more I/O devices/interfaces 1210. In certain embodiments, the computing device 1200 can include fewer or more components than those shown in FIG. 12. Components of computing device 1200 shown in FIG. 12 will now be described in additional detail.

In particular embodiments, processor(s) 1202 includes hardware for executing instructions, such as those making up a computer program. As an example, and not by way of limitation, to execute instructions, processor(s) 1202 may retrieve (or fetch) the instructions from an internal register, an internal cache, memory 1204, or a storage device 1208 and decode and execute them. In various embodiments, the processor(s) 1202 may include one or more central processing units (CPUs), graphics processing units (GPUs), field programmable gate arrays (FPGAs), systems on chip (SoC), or other processor(s) or combinations of processors.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1204 may be internal or distributed memory.

The computing device 1200 can further include one or more communication interfaces 1206. A communication interface 1206 can include hardware, software, or both. The communication interface 1206 can provide one or more interfaces for communication (such as, for example, packet-based communication) between the computing device and one or more other computing devices 1200 or one or more networks. As an example, and not by way of limitation, communication interface 1206 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can comprise hardware, software, or both that couples components of computing device 1200 to each other.

The computing device 1200 includes a storage device 1208 includes storage for storing data or instructions. As an example, and not by way of limitation, storage device 1208 can comprise a non-transitory storage medium described above. The storage device 1208 may include a hard disk drive (HDD), flash memory, a Universal Serial Bus (USB) drive or a combination these or other storage devices. The computing device 1200 also includes one or more input or output ("I/O") devices/interfaces 1210, which are provided to allow a user to provide input to (such as user strokes), receive output from, and otherwise transfer data to and from the computing device 1200. These I/O devices/interfaces 1210 may include a mouse, keypad or a keyboard, a touch screen, camera, optical scanner, network interface, modem, other known I/O devices or a combination of such I/O devices/interfaces 1210. The touch screen may be activated with a stylus or a finger.

The I/O devices/interfaces 1210 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1210 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A system comprising:
a memory component; and
a processing device coupled to the memory component, the processing device to perform operations comprising:
receiving an input including an image depicting a chroma key scene and a color value corresponding to a background color of the image;
generating a preprocessed image by concatenating the image depicting the chroma key scene and a color value image, wherein all pixels of the color value image correspond to the color value corresponding to the background color of the image;
providing the preprocessed image to a trained neural network; and
generating, using the trained neural network, an alpha matte representation of the image based on the preprocessed image.

2. The system of claim 1, wherein to generate the preprocessed image by concatenating the image depicting the chroma key scene and the color value image, the processing device further performs operations comprising:
spatially repeating the color value to match a resolution of the image depicting the chroma key scene.

3. The system of claim 1, wherein to train the trained neural network, the processing device further performs operations comprising:
providing a preprocessed training image corresponding to a training image to a neural network;
receiving, from the neural network, a training output including a predicted alpha matte representation of the training image; and
training the neural network to generate predicted alpha mattes based on calculating loss using the predicted alpha matte representation of the training image and a ground truth alpha matte corresponding to the training image.

4. The system of claim 3, wherein to train the trained neural network, the processing device further performs operations comprising:
applying noise to a synthetic chroma background of the training image, the noise including one or more of shadows, wrinkles, and motion blur.

5. A method comprising:
generating, by a processing device, a training input, the training input including a training image depicting a chroma key scene;
augmenting the training image;
generating a preprocessed training image by concatenating the augmented training image and a color value image, wherein all pixels of the color value image correspond to a color value of a background color of the augmented training image; and training, by the processing device, a neural network based on the preprocessed training image to generate a trained neural network that generates a predicted alpha matte representation of the training image.

6. The method of claim 5, further comprising:

computing a pixel loss and a gradient loss using the predicted alpha matte representation of the training image and a ground truth alpha matte corresponding to the training image; and backpropagating the pixel loss and the gradient loss to the neural network.

7. The method of claim 6, wherein computing the pixel loss and the gradient loss further comprises:

applying a higher spatially varying loss weighting to transparent pixels over solid foreground and background pixels.

8. The method of claim 5, wherein training the neural network based on the training image further comprises:

providing the preprocessed training image corresponding to the training image to the neural network.

9. The method of claim 5, wherein generating the preprocessed training image by concatenating the augmented training image and the color value image further comprises:

spatially repeating the color value to match a resolution of the training image.

10. The method of claim 5, wherein generating the training image depicting the chroma key scene further comprises:

receiving a source image and a ground truth alpha matte corresponding to the source image, extracting a foreground object from the source image, obtaining a synthetic chroma background, and generating the training image by alpha blending the ground truth alpha matte, the extracted foreground object and the synthetic chroma background.

11. The method of claim 10 wherein obtaining the synthetic chroma background further comprises:

selecting a color for the synthetic chroma background, generating the synthetic chroma background using the selected color, the synthetic chroma background having a same resolution as the extracted foreground object, and applying a gradient to the synthetic chroma background.

12. The method of claim 10, wherein augmenting the training image further comprises:

applying noise to the synthetic chroma background of the training image, the noise including one or more of shadows, wrinkles, and motion blur.

13. A non-transitory computer-readable storage medium storing executable instructions, which when executed by a processing device, cause the processing device to perform operations comprising:

generating a training input, the training input including a training image depicting a chroma key scene;

augmenting the training image;

generating a preprocessed training image by concatenating the augmented training image and a color value image, wherein all pixels of the color value image correspond to a color value of a background color of the augmented training image; and training a neural network based on the preprocessed training image to generate a trained neural network that generates a predicted alpha matte representation of the training image.

14. The non-transitory computer-readable storage medium of claim 13, wherein the instructions further cause the processing device to perform operations comprising:

computing a pixel loss and a gradient loss using the predicted alpha matte representation of the training image and a ground truth alpha matte corresponding to the training image; and backpropagating the pixel loss and the gradient loss to the neural network.

15. The non-transitory computer-readable storage medium of claim 14, wherein to compute the pixel loss and the gradient loss, the instructions further cause the processing device to perform operations comprising:

applying a higher spatially varying loss weighting to transparent pixels over solid foreground and background pixels.

16. The non-transitory computer-readable storage medium of claim 13, wherein to train the neural network based on the training image the instructions further cause the processing device to perform operations comprising:

providing the preprocessed training image corresponding to the training image to the neural network.

17. The non-transitory computer-readable storage medium of claim 13, wherein to generate the preprocessed training image by concatenating the augmented training image and the color value image, the instructions further cause the processing device to perform operations comprising:

spatially repeating the color value to match a resolution of the training image.

18. The non-transitory computer-readable storage medium of claim 13, wherein to generate the training image depicting the chroma key scene, the instructions further cause the processing device to perform operations comprising:

receiving a source image and a ground truth alpha matte corresponding to the source image, extracting a foreground object from the source image, obtaining a synthetic chroma background, and generating the training image by alpha blending the ground truth alpha matte, the extracted foreground object and the synthetic chroma background.

19. The non-transitory computer-readable storage medium of claim 18, wherein to obtain the synthetic chroma background, the instructions further cause the processing device to perform operations comprising:

selecting a color for the synthetic chroma background, generating the synthetic chroma background using the selected color, the synthetic chroma background having a same resolution as the extracted foreground object, and applying a gradient to the synthetic chroma background.

20. The non-transitory computer-readable storage medium of claim 18, wherein to augment the training image, the instructions further cause the processing device to perform operations comprising:

applying noise to the synthetic chroma background of the training image, the noise including one or more of shadows, wrinkles, and motion blur.

* * * * *